(12) United States Patent
Subrahmanyan

(10) Patent No.: US 7,031,116 B2
(45) Date of Patent: Apr. 18, 2006

(54) MOVING MAGNET VOICE COIL MOTOR USING HALBACH ARRAYS

(75) Inventor: Pradeep Kumar Subrahmanyan, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 631 days.

(21) Appl. No.: 09/893,194

(22) Filed: Jun. 27, 2001

(65) Prior Publication Data

US 2002/0054458 A1 May 9, 2002

Related U.S. Application Data

(60) Provisional application No. 60/229,568, filed on Aug. 30, 2000.

(51) Int. Cl.
*G11B 21/08* (2006.01)
(52) U.S. Cl. .................................. 360/264.7
(58) Field of Classification Search ... 360/264.1–264.9
See application file for complete search history.

(56) References Cited

U.S. PATENT DOCUMENTS

| | | | |
|---|---|---|---|
| 5,016,131 A * | 5/1991 | Riggle et al. ............ | 360/264.7 |
| 5,041,935 A * | 8/1991 | Aruga et al. ............. | 360/264.9 |
| 5,267,110 A * | 11/1993 | Ottesen et al. | |
| 5,465,242 A * | 11/1995 | Terashima et al. ....... | 369/44.19 |
| 5,488,594 A * | 1/1996 | Kobayashi et al. ...... | 369/44.14 |
| 5,521,778 A * | 5/1996 | Boutaghou et al. | |
| 6,046,889 A * | 4/2000 | Berding et al. | |
| 6,061,208 A * | 5/2000 | Hattori | |
| 6,104,581 A * | 8/2000 | Huang et al. ............ | 360/264.7 |
| 6,388,836 B1 * | 5/2002 | Anderson et al. ........... | 360/128 |
| 6,424,503 B1 * | 7/2002 | Chin et al. ............... | 360/265.2 |
| 6,449,130 B1 * | 9/2002 | Koyama .................. | 360/264.4 |
| 6,498,706 B1 * | 12/2002 | Takekawa et al. ....... | 360/294.5 |
| 6,507,463 B1 * | 1/2003 | Boutaghou ............... | 360/294.3 |

* cited by examiner

*Primary Examiner*—Allen Cao
(74) *Attorney, Agent, or Firm*—Derek J. Berger

(57) ABSTRACT

An information handling system includes a base, a disc rotatably attached to the base, and an actuator assembly movably attached to the base the actuator assembly. An actuator assembly has an opening at the pivot therein. An actuator arm attached to the main body, and a voice coil motor is positioned within the opening of the actuator assembly. The voice coil motor also includes at least two magnets attached to the main body of the actuator arm. The magnets are arranged as a Halbach array. The voice coil motor is positioned within the opening of the actuator assembly, and near one end of the actuator assembly and at least one load spring and transducer are positioned at the other end of the actuator assembly.

19 Claims, 6 Drawing Sheets

MOVING MAGNET VOICE COIL MOTOR USING HALBACH ARRAYS

RELATED APPLICATION

This application claims the benefit of U.S. Provisional Application Ser. No. 60/229,568, filed Aug. 30, 2000 under 35 U.S.C. 119(e).

FIELD OF THE INVENTION

The present invention relates to the field of mass storage devices. More particularly, this invention relates to a voice coil motor of an actuator of a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

An actuator is used to move the read/write head or transducer. A voice coil motor (VCM) is used to move the actuator. The VCM is a Lorentz type actuator and hence linear in its characteristics. In most disc drives, the coil of the voice coil motor is attached to the actuator assembly. Most rotary actuators have a y-shaped yoke which holds a voice coil located at one end of the actuator. At least one magnet is positioned near the voice coil on the yoke to form a voice coil motor. The VCM typically comprises a loop of copper wire in a magnetic circuit. Application of current to the coil leads to generation of a Lorentz force in the actuator. A bearing cartridge is placed at the pivot point of the actuator so that the actuator pivots about the bearing. Due to the offset between the force axis and the pivot axis, a resultant torque is induced which rotates the VCM. This design has many shortcomings. First, this is a high inertia design which lowers resonant frequencies of the actuator. Higher resonant frequencies are desired in actuators so as to place the resonant frequencies to be outside the normal operating range of the actuator. Also, there is a restriction on the amount of current input to the coil because of the absence of a heat sink to conduct heat away from the coil. The yoke of current voice coil motors is made as light and with as little an amount of material as possible. Such a yoke is just the opposite of a good heat sink which can remove heat from the coil. The most significant shortcoming however is that the torque used to move the rotary actuator does not act through the pivot point, but is a result of off-axis forces. While the off-axis forces result in a torque about the pivot, they also result in a force through the pivot point which moves the actuator assembly slightly to one side or the other. This mode of motion of the actuator is called the primary mode or the actuator translation mode. The amount of motion due to this mode is slight, but the slight motion is significant since the track density on the disc is so high. For example, current designs have track densities as high as 58000 tracks per inch ("TPI"). In essence, the track width is very small and so side motion is significant and results in track misregistration. There is also a constant push to increase areal density which means that even higher track densities are anticipated in the future. As a result, this problem will get worse as the track densities increase.

The actuator translation mode also called the primary mode is also the biggest limiting mechanism to implementing high bandwidth controllers on the VCM axis. The current VCM compounds this problem in two ways. First of all, the current VCM is not a true torque actuator and the off-pivot axis force results in not only a torque $\tau$ about the pivot, but also a lateral force $F_\tau$ that directly excites the actuator translation mode. This causes increased non-repeatable runout (NRRO). This phenomenon is best illustrated and discussed in FIG. 2 of this application. Secondly, the presence of a high density and low specific strength material such as copper far away from the pivot axis increases both the mass and the polar moment of inertia of the actuator significantly. Without corresponding increases in the stiffness of the bearing cartridge, this increased mass leads to a reduction in the primary translation mode. This in turn limits achievable bandwidth and also leads to error components in the NRRO spectrum.

Another problem related to the inertia of the current VCM is that it has a high moment of inertia which limits the speed of the seeks can be accomplished. Seeks require the actuator to change directions and stop over a track. Higher inertia VCMs take a longer time to change direction and a longer time to settle over a track to assure that the transducer is actually over the desired track from which data will be obtained or to which information representing data will be written.

What is needed is a disc drive which provides for either elimination or a substantial reduction in the translation mode of excitation and which also allows for faster seek times and improved bandwidth capability on read and write operations. In addition, there is a need for a stiffer mechanical structure by eliminating the coil of the voice coil magnet hanging off one end of the actuator assembly. There is also a need for improved heat sink for the coil of the voice coil motor and an efficient use of the flux from the magnets. There is also a need for a voice coil magnet that will not produce a flux pattern that will interfere with magneto resistive heads and which will not interfere with information representing data which is stored on a disc. There is also a need for an actuator assembly that has a lower moment of inertia than current designs which also would allow for faster access times. There is also a need for a true torque motor that will not translate with respect to the pivot.

SUMMARY OF THE INVENTION

A disc drive comprises a base which in turn supports a disc pack driven by a spindle motor and a rotary actuator assembly that positions the read/write transducer over the disc surface. The design of the rotary actuator is the key to this invention. The rotary actuator comprises a yoke attached to the base. A copper coil is wound on this yoke. Besides, there is a permanent magnet array mounted on the rotary hub. The interaction of the magnetic flux from the permanent magnet array and the current through the stationary coil produces a torque that rotates the hub about the yoke. The permanent magnet array is based on the Halbach array design. There are two magnets that are oriented radially while the other two magnets are oriented circumferentially. The radial magnets drive the magnetic flux radially through the air gap and into the coil while the circumferential magnets provide the return path for the flux. Manufacturing issues restrict fabrication of circumferentially oriented magnets. An approximation to the circumferential orientation is obtained through a plurality of magnets that are oriented longitudinally. The yoke is made of a material capable of absorbing heat and in some embodiments is formed of the same material as the base. The coil is wound about the yoke so that the base and the yoke act as a heat sink for heat generated by the passage of current through the coil. During operation, the two legs of the coil produce equal and opposite parallel forces resulting in a couple about the pivot. As a result, there are no translation forces exerted on the pivot and the voice coil motor is a true torque motor.

An actuator assembly for a disc drive includes a main body having an opening therein. An actuator arm attached to the main body, and a voice coil motor is positioned within the opening of the actuator assembly. A set of at least two radial and two circumferential magnets form the rotor of the voice coil motor. The voice coil motor also includes a coil about which the rotor rotates. In one embodiment, the voice coil motor has a plurality of magnets oriented as a circular Halbach array attached to the main body of the actuator arm. The plurality of magnets are oriented about a circle so that the magnetic flux outside a perimeter of the magnets is negligible. The voice coil motor is positioned within the opening of the actuator assembly, and near one end of the actuator assembly and at least one load spring and transducer are positioned at the other end of the actuator assembly. A disc drive which uses the above described Halbach array voice coil motor provides for elimination in the translation mode of excitation. The actuator assembly is capable of faster seek times and improved bandwidth capability on read and write operations since the moment of inertia of the structure is reduced when compared to actuators with a heavy coil positioned away from the pivot of the actuator assembly. In addition, the mechanical structure is stiffened since the coil of the voice coil motor no longer hangs off one end of the actuator assembly. Still a further advantage is that the coil in the inventive voice coil motor is positioned on a metal yoke which is in turn attached to the base or deck of the disc drive and this provides an improved heat sink for the coil. The magnetic flux of the magnets is efficiently used since the flux is directed to the core area between the magnets and a negligible amount is directed outside of the voice coil motor. The voice coil magnet configured as a Halbach Array also does not produce a flux pattern that will interfere with magneto resistive heads or with information representing data which is stored on a disc. Additional features and benefits will become apparent upon a review of the attached figures and the accompanying description.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
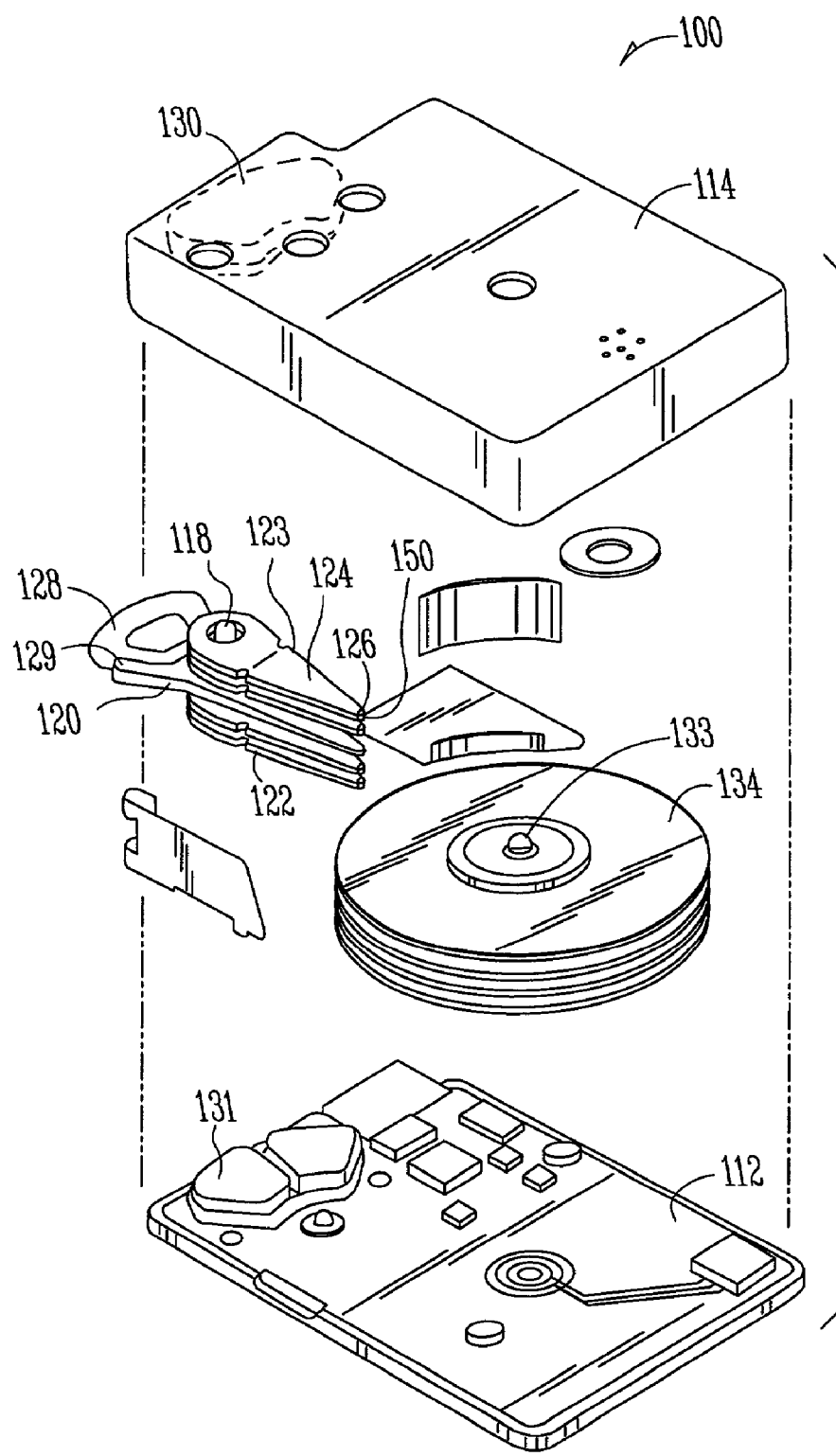
FIG. 1 is an exploded view of a disc drive with a multiple disc stack and actuator assembly with a voice coil motor of a prior art design.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator of the prior art. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a y-shaped yoke 129 for holding a voice coil 128. The yoke 129 can be integrally formed with the actuator assembly or can be formed as a separate piece and assembled as shown in FIG. 1. The voice coil 128 is attached to the yoke 129 using an adhesive.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
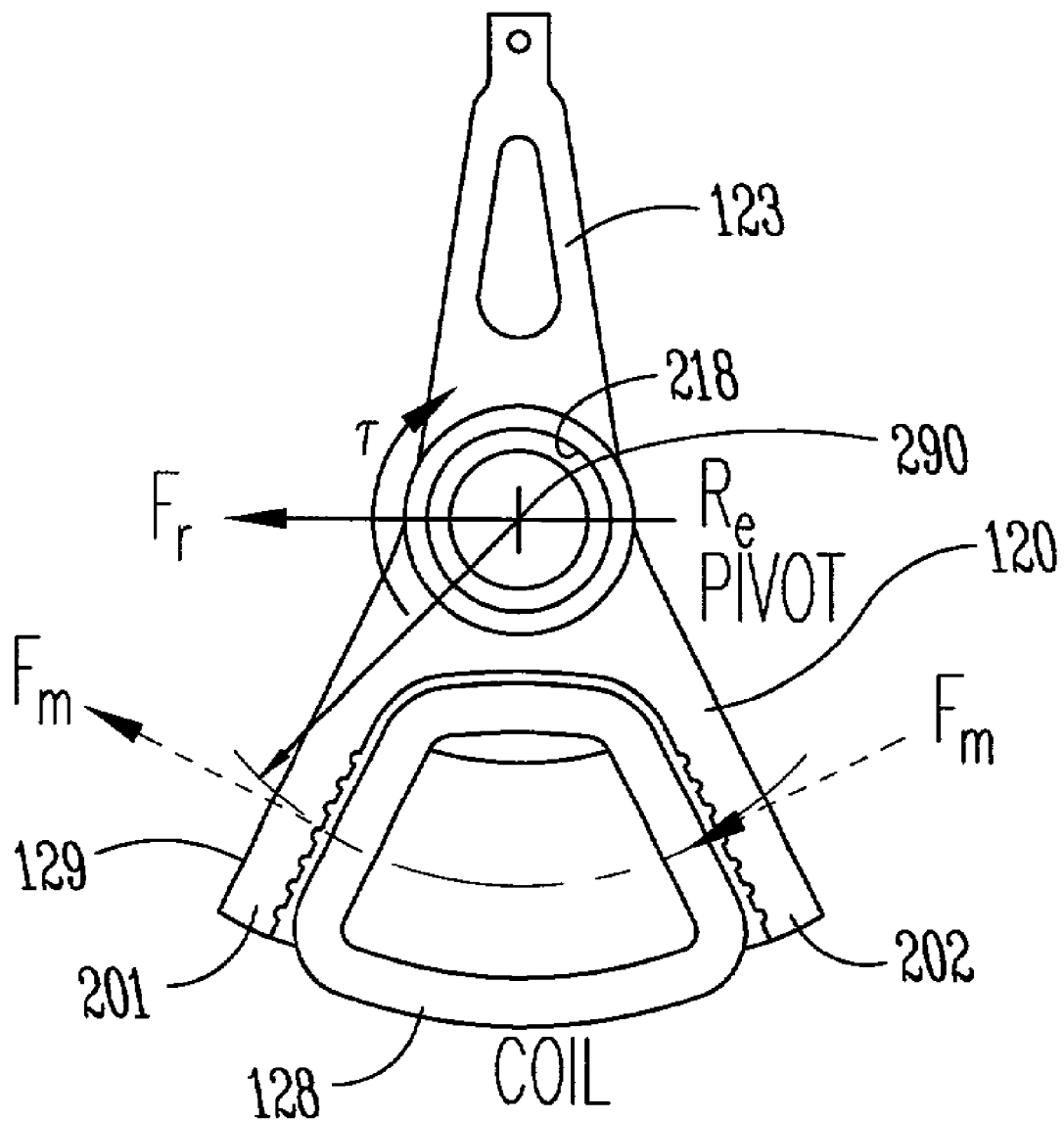
FIG. 2 is a top view of an actuator assembly using the prior art design voice coil motor.

FIG. 2 is a top view of an actuator arm assembly 120 having a yoke 129. The actuator assembly 120 includes an opening 218 therein. The opening generally receives a bearing cartridge (not shown). The bearing cartridge is centered within the opening 218 and the actuator arm pivots around the bearing cartridge. The axial center of the opening 218 is the pivot axis or pivot point 290 of the actuator. The bearing cartridge includes the actuator shaft 118 (shown in FIG. 1) in an assembled actuator assembly 120. As can be seen from FIG. 2, the voice coil 128 is positioned at a distance from the pivot point of the actuator assembly 120 on a first leg 201 and a second leg 202 of the yoke. The yoke 129 includes a bonding surface 210. The voice coil 128 is bonded to the yoke 129. The remote position of the coil 128 with respect to the pivot point 290 causes an off-pivot axis force which in turn results in a torque τ about the pivot 290, as well as a lateral force $F_\tau$ that forces the actuator to a position directly opposite the direction of the force. The lateral force $F_\tau$ also excites the actuator translation mode. This causes increased non-repeatable runout The VCM in its current form comprises a loop of copper wire (coil 128) in a magnetic circuit, which includes magnets 130 and 131 and a set of flux paths. Application of current to the coil 128 leads to generation of a Lorentz force in the actuator. Due to the offset between the force axis and the pivot axis, a resultant torque is induced which rotates the VCM. Since this arrangement places a relatively heavy coil 128 at a distance from the pivot 290, the actuator has a relatively high moment of inertia which lowers resonant frequencies of the actuator and also slows the seek time of the actuator. The first leg second legs of the yoke which hold the coil 128 are also not a large heat sink. As a result, there is a restriction on the amount of current input to the coil because of the absence of a heat sink to conduct heat away from the coil 128. In other words, one could speed the actuator by increasing the current in the coil 128, however, the amount of current that can be sent through the coil 128 is limited since there is not enough material for removing the heat from the coil 128.

Besides the above, the other key parameter of interest in a VCM actuator is the ratio between the torque constant $K_t$ and the polar moment of inertia J. The following holds true for any VCM $$K_t = 2NR_e BL \quad (1)$$

$$J = MR_g^2 \quad (2)$$

where,
N is the number of turns of the coil
$R_e$ is the effective radius of the actuator (illustrated in FIG. 2),
B is the magnetic flux density in the air gap,
L is the length of each arm of the coil in the magnetic circuit,
M is the mass and
$R_g$ is the radius of gyration.

A parameter called the critical radius $R_c$ which is some measure of the effective radius $R_e$ and the radius of gyration $R_g^1$ can now be defined. The following definitions can be made based on the above listed equation [2].

$$K_t \propto R_c \quad (3)$$

$$J \propto R_c^2 \quad (4)$$

$$\Rightarrow \frac{K_t}{J} \propto \frac{1}{R_c} \quad (5)$$

Equation [5] brings out the metric we seek to maximize in a disc drive to obtain fast seeks. It should be noted that the critical radius $R_c$ is inversely proportional to the parameter we want to maximize. Hence, it is beneficial to minimize the critical radius $R_c$ minimizing the polar moment of inertia J.

Figure 3:
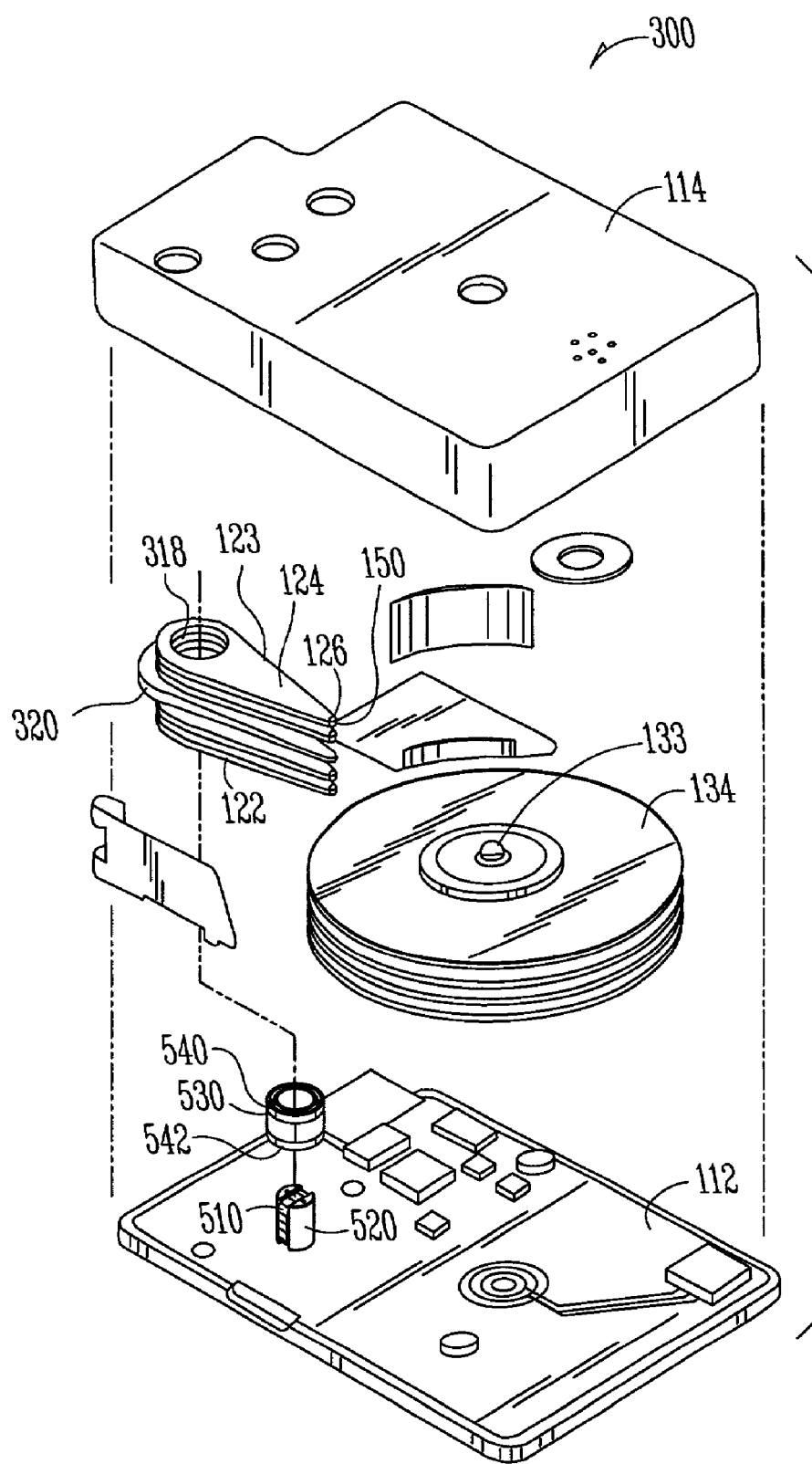
FIG. 3 is an exploded view of a disc drive with a multiple disc stack and actuator assembly with a voice coil motor employing one embodiment of the invention.

FIG. 3 is an exploded view of a disk drive 300 that uses a voice coil motor 500 of this invention. The disk drive 300 includes a base 112 and a cover 114. Rotatively attached to the base is a spindle hub 133 having at least one disk 134 attached to this spindle hub. As shown, there are 4 disks 134 stacked on to the spindle hub 133. It should be noted that the number of disks 134 is not limited to a specific number. The voice coil motor 500 is attached to the base 112 and includes a coil 510 wound upon a stator 520. The stator 520 is essentially cylindrical in shape. The stator is made of metal or other heat sink material and can readily transfer the heat from the coil 510 into the base of 112 or the cover 114 of the disk drive 300. A permanent magnet array 530 held in an Aluminum holder 541 and also bounded on each end by a bearing set 540 and 542 fits over the stator 520 and coil 510 during operation of the voice coil motor. Now turning to FIG. 3, the actuator assembly 320 include arms 123, slide load beams or load springs 124, a slider 126 having a transducer 150. In practice, the magnet array 530, which includes the upper bearing 540 and a lower bearing 542 and an Aluminum holder 541 for the magnets within the magnetic array is bonded to the inner surface of the opening 318 of the actuator 320. Thus, the magnet array 530 are the rotary portion of the voice coil motor while the coil 510 and the stator 520 are the stationary portion of the voice coil motor. It is worthy of note that the voice coil motor of the instant invention is housed within the opening 318 in the actuator assembly. In other words, the voice coil motor 500 serves as the pivot for the actuator assembly 320. In other words, the yoke or stator 520 and the coil 510 wound around the yoke or stator 520 and the magnet assembly 530 form the axis of rotation for the actuator assembly 320.

Figure 4:
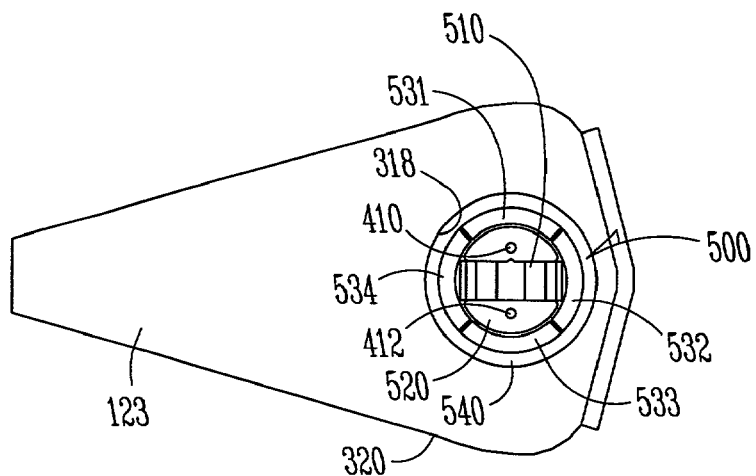
FIG. 4 is a top view of an actuator assembly using the voice coil motor of this invention.

FIG. 4 is a top view of the actuator assembly 320 using the voice coil motor 500 of this invention. In this particular view, the load beams or load springs, sliders 126 and transducers 150 have been removed for the sake of clarity. The actuator assembly 320 includes the opening 318. Visible in the top view are the coil 510 and the stator 520. The magnet assembly 530 is also visible and includes a first magnet 531, a second magnet 532, a third magnet 533 and a fourth magnet 534. The upper bearing 540 over the bearing set is not shown so the magnets are visible. The stator 520 is also a yoke for the winding or coil 510. The stator includes 2 threaded openings 410, 412 which are used to attach the cover 114 to the stator to provide further stability for the stationary or non-rotating part of the voice coil motor 500.

Figure 5:
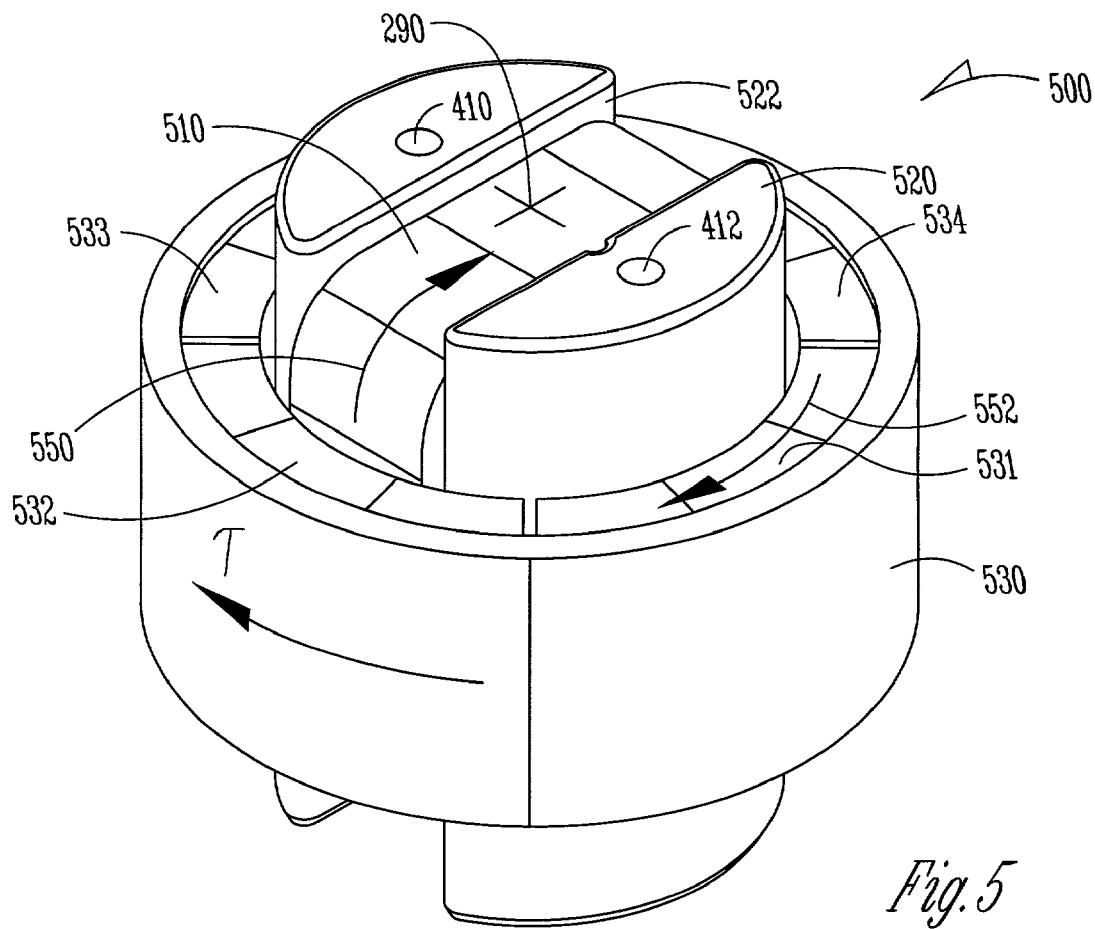
FIG. 5 is an isometric view of the voice coil motor of this invention.

FIG. 5 is an isometric view of the voice coil motor 500 of this invention. The voice coil motor 500 shown in FIG. 5 is devoid of the bearing set so that all that is seen is the voice coil motor 500. FIG. 5 shows the yoke which is also the stator 520. The yoke 520 is essentially a cylindrical stock which has been machined out with a groove 522 therein. The coil 510 is wound upon the yoke or positioned within the groove 522 of the voice coil motor. The yoke or stator 520 further includes a first opening 410 and a second opening 412 which are adapted to receive a threaded fastener either from the base 112 or from the cover 114. The threaded fasteners attach the stator 520 or the yoke to the base 112 and the cover 114. An annular magnet assembly 530 includes a set or a set of magnets 531, 532, 533, and 534 which are held by an Aluminum or other non-flux conductive holder 541.

Figure 6:
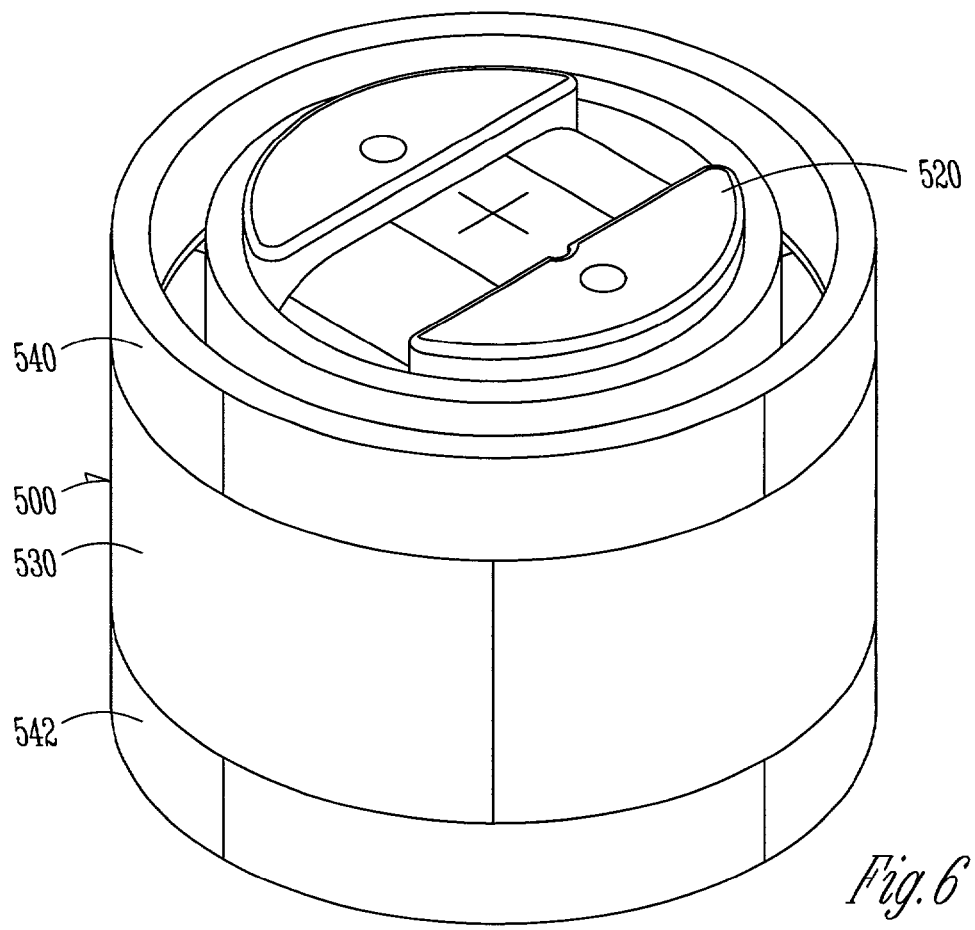
FIG. 6 is an isometric view of the voice coil motor and bearing assembly of this invention.

FIG. 6 is an isometric view of the voice coil motor 500 and bearing assembly of this invention. FIG. 6 is very close to FIG. 5 and therefore only the differences between FIGS. 5 and 6 will be discussed for the sake of brevity and for the sake of clarity. FIG. 6 shows the voice coil motor 500 with the yoke or stator 520 and coil 510 wrapped around the yoke. It should be noted that the yoke and coil 510 actually comprise the stator because this is the stationary portion of the voice coil motor 500. FIG. 6 shows the addition of the top bearing 540 and the lower bearing 542 to form the combination voice coil motor and bearing assembly which fits within the opening 318 and an actuator assembly 320 [FIG. 3].

Figure 7:
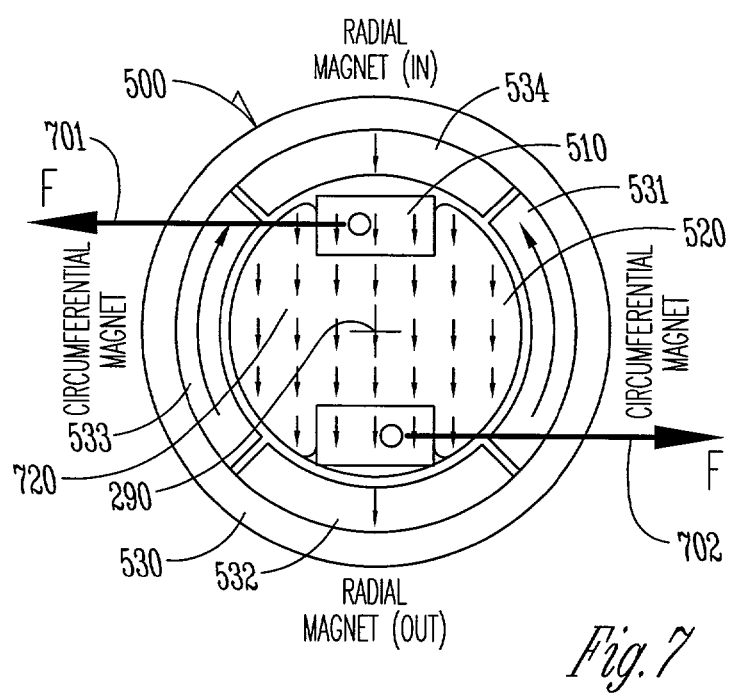
FIG. 7 is a top schematic view of one embodiment of the voice coil motor.

FIG. 7 is a top view of just the actuator arrangement. It illustrates the magnet array arrangement and the physical principles behind the actuator. The magnet array or magnet assembly 530 is a Halbach array of magnets. The Halbach array has magnets that are radially poled in a first orientation and adjacent magnets that are circumferentially poled in an orientation which is orthogonal to an adjacent magnet. In other words, magnet 532 is poled radially in the direction of the arrow 550 shown in FIG. 7. Meanwhile the magnets adjacent to magnet 532 are poled circumferentially as depicted by the direction of the arrow 552. The advantage of a Halbach array is that it is very efficient and it focuses the flux path of the magnetic field within the annular portion of the magnet assembly 530. An additional advantage with a Halbach array is that the magnetic flux is focused on the inner portion of the annulus and there is very little flux or a negligible amount of leakage flux that will not be positioned within the opening in the magnet assembly. In other words, the stator 520 and the coil 510 which is part of the stator sits within a very focused magnetic field so that for a given current within the coil 510 I, a maximum amount of torque $\tau$, can be produced. It should also be noted that the Halbach array voice coil motor 500 is a true-torque actuator. This happens because the electromagnetic force generated results in a couple due to the parallel system of equal and opposite forces about the pivot. The result is that there is no translation force which forces a portion of the voice coil or actuator assembly towards one side or the other of the voice coil motor. Thus, this particular voice coil motor 500 has no force of translation which was one of the biggest mechanical problems seen with previous or current voice coil motors.

The Halbach array VCM (HAVCM) 500 has many advantages over the conventional VCM of FIGS. 1 and 2. The HAVCM is a moving magnet type true torque actuator. True torque means that there is no force of translation, Ft, produced by the HAVCM 500. True torque actuation makes it possible to eliminate excitation of the actuator translation mode. In addition, the copper coil 510 is wound on the stator 520, thus reducing the effects of this low specific stiffness material on the mass and stiffness of the rotating parts. With this mass of the copper coil placed at the pivot point 290, the polar moment of inertia, J is minimized. The Halbach array of magnets focuses the flux produced within the annular ring of magnets. Maximum flux for a given current through the coil 520 maximizes $K_t$. Thus $K_t$ is maximized while J is minimized which maximizes the metric $$\frac{K_t}{J}$$

sought to be maximized (see equation 5). A three dimensional, isometric view of the HAVCM 500 illustrated in FIG. 5 reveals the merits of the HAVCM 500. The HAVCM 500 is a Lorentz type actuator with a current carrying copper loop 510 placed in a uniform magnetic field. FIG. 7 is a top schematic view of one embodiment of the voice coil motor. Passing current through coil 510 causes a force density to be generated according to the Lorentz law. Integrating the force density over the effective volume of the copper coil gives the resultant force. Due to the orientation of the coil (and hence the current density) and the magnetic field, equal and opposite forces 701, 702 are generated in the arms of the coil 510. This results in a couple being generated about the pivot axis with no resultant force terms. Hence, this is a pure torque actuator that causes no translation force. An additional advantage is the compact design suitable for easy implementation in a disk drive.

One of the key features of the HAVCM 500 is the magnetic circuit. The arrangement of magnets 531, 532, 533, 534 in the HAVCM 500 follows the Halbach array scheme. The Halbach array was originally invented for use in accelerators by Klaus Halbach. This has subsequently been used in linear motors for Maglev stages. Halbach Arrays have also been used in levitated trains. The fundamental idea behind a Halbach array is its ability to produce oriented fields on one side of the magnet array. Thus the Halbach array has a so-called strong side where most of the magnetic flux is concentrated and a weak side where the magnetic flux density is negligible. In this invention the property of the Halbach array is used to concentrate the magnetic flux within the pivot as shown by the multitude of arrows 720. This arrangement of the magnets has two advantages. First of all, a higher magnetic flux density in the air gap 730 means that a higher torque can be produced for the same current density through the coil 510. This is because the force density is related to the flux and current densities through the Lorentz law:

$$F = J \times B \qquad (6)$$

where F is the force density, J the current density and B the flux density. Secondly, the concentration of the flux inside the area near the pivot 290 mitigates possible disadvantages of moving the actuator closer to the heads and the media.

Still referring to FIG. 7, we observe that such a Halbach array comprises four magnets 531, 532, 533, 544, two of which are circumferentially poled 531, 533 and two of which are radially poled 532, 534. It has been shown that an arrangement of magnets according to the Halbach array design helps increase the flux density inside the air gap 730 by a factor of $\sqrt{2}$[4]. These studies were made on linear motors rather than the rotary limited angle motor 500 of this invention. The radially poled magnets 532, 534 serve to orient the field 720 within the array 530 while the circumferentially poled magnets 531, 533 serve as return paths for the flux. A similar flux in the air gap 720 could also be obtained by placing two radial magnets on a complex back iron structure. Indeed the stator in most electric motors is formed out of such a structure (with electromagnets rather than permanent magnets to form the magnetic poles). However, putting the complex back iron structure on the rotor of the VCM would involve a higher inertia, costlier motor.

Figure 8:
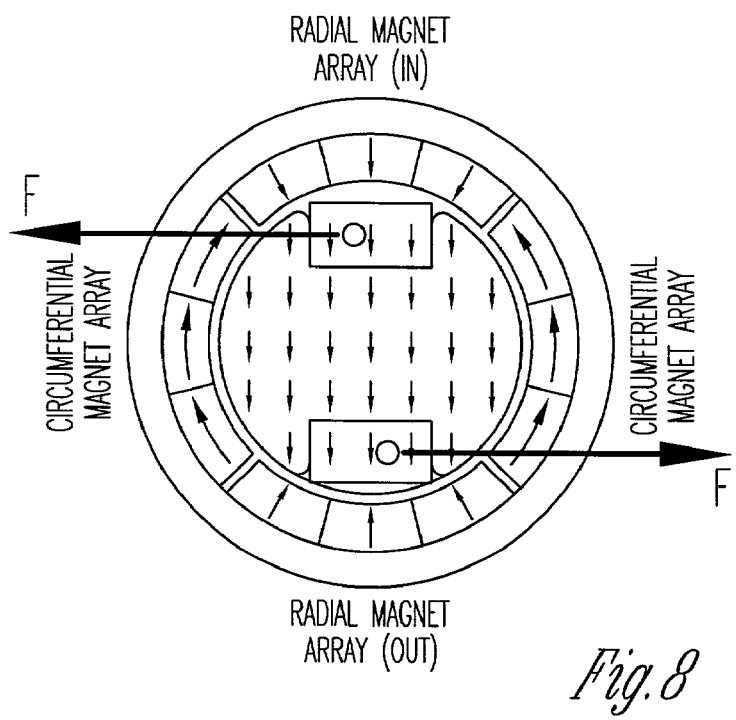
FIG. 8 is a top schematic view of another embodiment of the voice coil motor.

In practice, while it is easy to fabricate radially poled magnets, it is rather difficult to fabricate circumferentially poled magnets. An approximation to a circumferentially poled magnet can be obtained by an array of smaller magnets which are poled tangentially. Such an arrangement is illustrated in FIG. 8. With the arrangement shown in FIG. 8, there is some loss in the air gap flux density, when compared to the magnet array illustrated in FIG. 7.

To constrain the five degrees of freedom other than the desired rotational degree of freedom, a pair of deep groove ball bearings 540, 542 are placed both above and below the magnet array 530. The bearings 540, 542 occupy the space near the end turns of the coil 500, thus saving space and leading to a compact design. A small amount of preload can also be implemented through the pivot shaft, the bearing race and the magnet ring to hold the magnets in place. A mechanical arrangement illustrating the coil, magnets, the bearings and the arm is shown in FIG. 6. With such an arrangement of the actuator, one can reduce the inertia and increase the stiffness leading to higher obtainable bandwidth and faster seek times from the HAVCM.

Advantageously, a disc drive which uses the above described Halbach array voice coil motor provides for either elimination or a substantial reduction in the translation mode of excitation. The actuator assembly is capable of faster seek times and improved bandwidth capability on read and write operations since the moment of inertia of the structure is reduced when compared to actuators with a heavy coil positioned away from the pivot of the actuator assembly. In addition, the mechanical structure is stiffened since the coil of the voice coil magnet no longer hangs off one end of the actuator assembly. Still, a further advantage is that the coil in the inventive voice coil motor is positioned on a metal yoke which is in turn attached to the base or deck of the disc drive and this provides an improved heat sink for the coil. The magnetic flux of the magnets is efficiently used since the flux is directed to the core area between the magnets and a negligible amount is directed outside of the voice coil motor. The voice coil magnet configured as a Halbach Array also does not produce a flux pattern that will interfere with magneto resistive heads or with information representing data which is stored on a disc. The HAVCM is also a pure torque VCM that does not produce a translation force, $F_{\tau}$. Furthermore use of the HAVCM eliminates the coil bending mode in an actuator.

Figure 9:
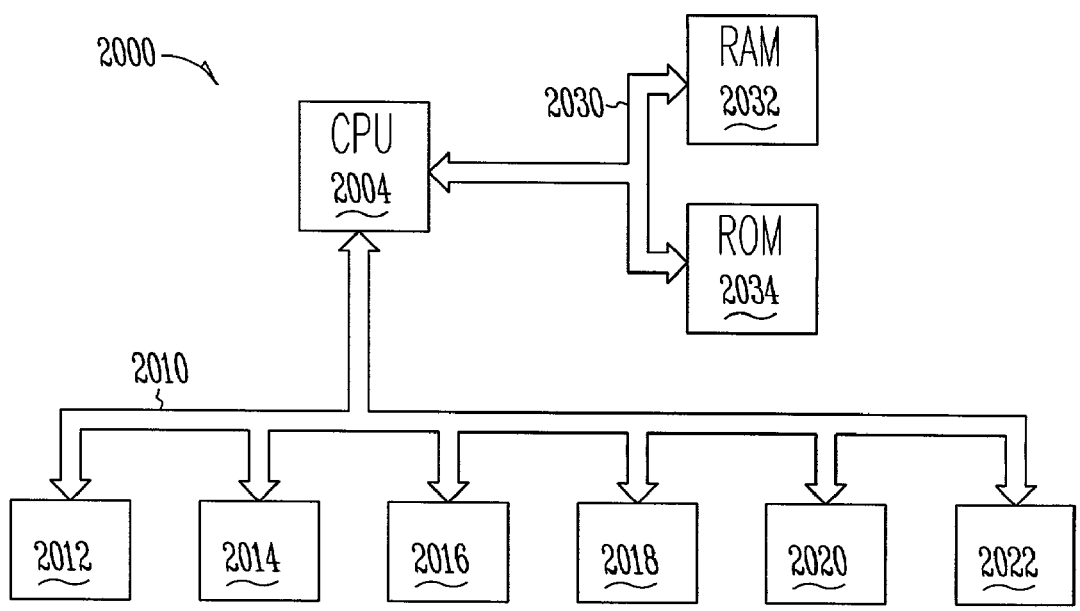
FIG. 9 is a schematic view of a computer system.

FIG. 9 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

CONCLUSION

In conclusion, an actuator assembly 320 for a disc drive 300 includes a main body having an opening 318 therein. An actuator arm attached to the main body, and a voice coil motor 510, 530 is positioned within the opening 318 of the actuator assembly 320. The voice coil motor 510, 530 also includes at least two magnets 531, 532 attached to the main body of the actuator arm 123. The magnets form a rotor 530 of the voice coil motor 510, 530. The voice coil motor 510, 530 also includes a coil 510 about which the rotor rotates. In one embodiment, the voice coil motor 510, 530 has a plurality of magnets 531, 532, 533, 534 attached to the main body of the actuator arm. The magnets are assembled such that adjacent magnet orientations are orthogonal to each other. The plurality of magnets 531, 532, 533, 534 are oriented about a circle so that the magnetic flux outside a perimeter of the magnets is negligible. The magnets 531, 532, 533, 534 are arranged as a Halbach array. The voice coil motor 510, 530 is positioned within the opening 318 of the actuator assembly 320, and near one end of the actuator assembly and at least one load spring 124 and transducer 150 are positioned at the other end of the actuator assembly 320.

An information handling system 300 includes a base 112, a disc 134 rotatably attached to the base 112, and an actuator assembly 320 movably attached to the base 112 the actuator assembly 320. A yoke 520 is attached to the base 112 and a coil 510 is attached to the yoke 520. An actuator assembly 320 has an opening 318 therein. The actuator assembly 320 further includes at least two magnets 531, 532 positioned near the opening 318. The magnets 531, 532, 533, 534 and coil 510 form a voice coil motor capable of rotating the actuator assembly 320 through an arc. The actuator 320 assembly is rotatably attached to the base 112 about the yoke 520. The voice coil motor further comprises a plurality of magnets 531, 532, 533, 534 attached to the main body of the actuator assembly 320. The voice coil motor includes a plurality of magnets 531, 532, 533, 534 circularly oriented so that the magnetic flux outside a perimeter of the circularly orientated magnets is negligible. The magnets 531, 532, 533, 534 of the voice coil motor arranged as a Halbach array. The yoke 520 is made of a material capable of absorbing heat and in some embodiments is formed of the same material as the base 112. The yoke 520, in some embodiments, is formed integral with the base 112. The coil 510 is wrapped about the yoke 520 so that the base 112 and the yoke 520 act as a heat sink for heat generated by passing current through the coil 510. During operation, the voice coil motor 510, 530 produces a first force about a pivot and a second force about the pivot, the first force being equal, opposite and parallel to the second force, thus resulting in a couple. As a result, the voice coil motor 510, 530 is a true torque motor.

Most generally, a disc drive 300 includes a base 112, at least one disc 134 rotatably attached to the base 112, and an actuator assembly 320 rotatably attached to the base 112. The actuator 320 is capable of passing through an arc and includes a device for moving the actuator assembly which is attached to the actuator assembly.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An actuator assembly for an information handling system comprising:
    a stationary shaft;
    a main body having an opening therein positioned around the shaft such that the main body is rotatable about the shaft;
    at least one actuator arm attached to the main body; and
    a voice coil motor comprising at least two magnets, the magnets being supported by the main body within the opening.

2. The actuator assembly for an information handling system of claim 1 wherein the magnets form a rotor of the voice coil motor.

3. The actuator assembly for an information handling system of claim 2 wherein the voice coil motor further comprises a coil about which the rotor rotates.

4. The actuator assembly for an information handling system of claim 1 wherein at least two of the magnets are adjacent one another, and the orientation of adjacent magnets are substantially orthogonal to one another.

5. The actuator assembly for an information handling system of claim 1 wherein the magnets are substantially circularly oriented so that the magnetic flux outside a perimeter of the circularly oriented magnets is negligible.

6. The actuator assembly for an information handling system of claim 1 wherein the magnets are arranged as a Halbach array.

7. The actuator assembly for an information handling system of claim 1 wherein the voice coil motor is positioned near one end of the actuator assembly and at least one load spring and transducer are positioned at the other end of the actuator assembly.

8. The actuator assembly of claim 1, in which the information handling system comprises a disc drive.

9. An information handling system comprising:
    a base;
    a yoke attached to the base;
    a coil attached to the yoke;
    a storage medium attached to the base; and
    an actuator assembly having an opening therein, the yoke being positioned within the opening, the actuator assembly further including at least two magnets positioned near the opening, the magnets and coil forming a voice cod motor, the actuator assembly capable of swinging through an arc and rotatably attached to the base about the yoke.

10. The information handling system of claim 9 wherein the voice coil motor further comprises a plurality of magnets attached to the main body of the actuator assembly, wherein the orientation of adjacent magnets are substantially orthogonal to one another.

11. The information handling system of claim 9 wherein the voice coil motor further comprises a plurality of magnets substantially circularly oriented so that the magnetic flux outside a perimeter of the circularly oriented magnets is negligible.

12. The information handling system of claim 11 wherein the voice coil motor further comprises a plurality of magnets arranged as a Halbach array.

13. The information handling system of claim 11 wherein the yoke is made of a material capable of absorbing heat.

14. The information handling system of claim 11 wherein the yoke is formed of the same material as the base.

15. The information handling system of claim 11 wherein the yoke is formed integral with the base.

16. The information handling system of claim 11 wherein the yoke is formed integral with the base and wherein the coil is wrapped about the yoke so that the base and the yoke act as a heat sink for heat generated by passing current through the coil.

17. The information handling system of claim 9 wherein the voice coil motor produces a first moment about a pivot and a second moment about the pivot, the first moment being substantially offset by the second moment.

18. The information handling system of claim 9 wherein the voice coil motor is a true torque motor.

19. The information handling device of claim 9, in which the storage medium comprises a rotating disc.

* * * * *